Patented Jan. 5, 1943

2,307,239

UNITED STATES PATENT OFFICE 2,307,239

MODIFIED CLAY

Ben W. Rowland, Appleton, Wis., assignor, by mesne assignments, to Edgar Brothers Company, Metuchen, N. J., a corporation of New Jersey No Drawing. Application September 26, 1939, Serial No. 296,569

17 Claims. (Cl. 106—288)

The present invention relates to improved fillers, pigments, coating compositions and the like, and the method of making the same, and more in particular to a modified clay particularly adapted for use in the paper industry. It is to be understood that by the term "clay" I include not only the earthy substances from which materials for use in the paper industry have been heretofore commonly obtained but also other hydrous aluminum silicates such as halloysite, pyrophyllite and beidellite.

Clay fillers, pigments, and coating compositions employed heretofore in the manufacture of paper have not been found entirely satisfactory for use in all types of paper, particularly a paper where a high brightness is desired. For example, to obtain a paper having a desired high brightness or whiteness it has sometimes been necessary to use, in addition to the clay, a material such as titanium dioxide. The use of titanium dioxide and like materials having an extremely high brightness has not been found commercially adaptable for all types of papers, particularly low cost papers, due to high cost. In addition to the above, the use of prior clay compositions was limited due to low oil absorption, high gloss and tendency to darken on calendering. The paper industry has long sought a low cost composition resistant to darkening when calendered and having a good brightness combined with low gloss and high oil receptivity.

Some of the objects of my invention are to provide a filler, pigmenting, or coating material having good brightness, and to provide a material suitable for use in paper making or finishing, which, when incorporated with or applied to the paper, will make the latter resistant to darkening when calendered, and will produce a paper having relatively low gloss and high oil absorption.

Further objects of my invention will be apparent as the description proceeds.

In general, it may be stated that the invention, in its preferred aspects at least, contemplates the heating of clay to a sufficient temperature and for a sufficient length of time to produce a material having the desired properties. Preferably, before being heated, there is incorporated with the clay one or more chemicals which include salts or hydroxides of alkali and alkaline earth metals and amphoteric metals such, for example, as aluminum and zinc. Such salts comprise the halides, particularly the chlorides and bromides, chlorates, nitrates, and sulphites of such metals. The chemicals which because of low cost and other reasons, have been found to be particularly available for this purpose are sodium chloride, potassium chloride, sodium bromide, sodium nitrate, sodium sulphite, sodium hydroxide, calcium chloride, magnesium chloride, aluminum chloride and zinc chloride. It will be understood that mixtures of two or more of these chemicals may be employed if desired.

Up to the present time common salt, sodium chloride, because of its low cost and other reasons, has been more generally used in the commercial practice of the invention than have any of the other chemicals. As a result of such commercial practice of using common salt, it has been found that the invention can be successfully employed in connection with various clays. For example, particularly good results have been obtained with all of the clays produced in Wilkinson and Washington Counties of the State of Georgia, these clays generally being designated "Georgia kaolin clays." On the other hand, there are certain clays which in connection with common salt, do not appear to be sufficiently improved to justify the expense of treatment, for example, clays known on the market as Ball clays. In any case the susceptibility of a given clay to improvement by the present invention can readily be determined by trial.

Experiments and tests which have been made up to the present time, indicate that those types of clays which respond well to the described treatment with chemical, for example, common salt, also respond to the treatment to some extent and show some improvement in respect of the desired end properties in connection with brightness, low gloss and ink receptivity, even if no chemical be added to the material before treatment. Also, the available data appears to indicate that the use of chemical is particularly effective in improving the brightness factor, so that, in the case of a clay having a sufficiently high brightness factor, the gloss and ink receptivity factors nevertheless may be improved by subjecting the material to the heating treatment in connection with little or no chemical.

When heating the clay, about 3 percent of chemical based on the weight of the clay is preferably employed although my invention may be practiced by using 0.5 to 40 percent salt. I prefer, however, not to use over 5 percent of salt as larger amounts increase the cost of the finished material without obtaining any comparable additional advantage. Furthermore, when chlorides are used hydrogen chloride gas is formed during the heating and it is desirable to keep the formation of gases of this type as low as possible due to corrosive action on the calcining equipment. The clay ordinarily loses from about 10 to about 15 percent of its weight during the heat treatment, although the loss in weight varies with the type of clay employed.

The time necessary to modify the clay depends to a great extent on what salt is employed and is proportional roughly to the temperatures employed. In the case of Georgia kaolin, for example, with about 3 percent of sodium chloride, heating at a temperature of about 965° C. for about five hours has been found to raise the brightness to about 92.1, as measured on the General Electric Reflection Meter using the infra-red filter and using magnesium carbonate as a standard.

A period of about 5 hours was also found sufficient for heating the clay provided it is heated in contact with the gaseous material from a clay-salt mixture undergoing heat treatment. The preferred heating time when a salt such as sodium chloride is used is between 1 and 5 hours with a temperature range of about 785°–965° C. The heating temperature should be over 600° C., good results being obtained with temperatures as high as 1100° and 1200° C. It is desirable, however, to keep the temperature below the fusion point of the mixture which is approximately 1800°–2000° C. since a fused product is more difficult to grind and is generally more abrasive. Indeed, for like reasons it is desirable to avoid temperatures high enough (e. g., temperatures substantially above 1200° C. in the case of Georgia kaolin) to produce an appreciable extent of actual sintering, i. e., incipient fusion tending to form hard clinkers as distinguished from small friable masses or agglomerations which may result from rotary kiln action and which can be broken up between the fingers. The minimum heating time is of the order of one-half to one hour and would require working at the higher temperatures with means for rapid heating of the clay-salt mixture.

On the other hand, heating the mixture for 15 hours does not adversely affect the final product. The time and temperature required vary with the type of apparatus used and with the quantity of material being treated. In general, it is preferred to use temperature sufficiently high to produce a good product in a reasonably short time. The optimum temperatures and heating times also vary somewhat with the type clays employed, but may easily be determined by those skilled in the art by simple experimental tests.

The clay-salt mixture may be heated in any suitable device or apparatus, such, for example, as the ordinary continuous rotary kiln such as may be used in the cement industry. The mixture is preferably stirred or agitated during the heating treatment so as to insure uniform heating, but good results may be obtained without stirring. The limited agitation or stirring taking place in the rotary kiln has been found in commercial use to be sufficient and to give excellent results. The clay used is usually pulverized before heating but this is not essential. After the heat treatment, the improved or modified clay may be ground to the extent necessary or desirable, say in the usual manner such as in a ball or similar mill before use in the paper industry.

For example, a particularly effective coating can be made with modified clay (of my invention) of which not more than 2% is coarser than 10 microns in equivalent spherical diameter and not more than 20% is coarser than 5 microns in equivalent spherical diameter. It will be understood by those skilled in the art, that the "equivalent spherical diameter" of a particle is the diameter as calculated from serimentation measurements, which diameter has been proven to approximate very closely the mean of all diameters, in various directions, of the actual particle. From experience, it appears preferable that my modified clay for paper coating or filling be at least of such fineness that not more than about 20% is coarser than 10 microns, and not more than about 60% is coarser than 5 microns, in equivalent spherical diameter; indeed, for superior results in coating work, the product should not have more than about 12% coarser than 10 microns, and not more than about 50% coarser than 5 microns—and substantially no particles (or at least not more than about 1%) coarser than about 30 microns. Furthermore, for use of my modified clay in or on paper, the presence either of particles larger than about 40 microns, or of relatively hard particles (e. g. particles substantially harder or more abrasive than Georgia kaolin) having a size greater than about 25 microns, is apt to reduce the smoothness of the paper or affect adversely the paper machinery. In certain cases—notably to avoid the requirement of an excess of casein in coating compositions—it is preferable that the product contain not more than about 10 to 15 percent of particles smaller than one micron; it will be appreciated that the low gloss, high ink respectivity and other advantages of the invention are fully achieved in particles smaller than one micron, and that their presence in substantially greater quantities certainly cannot be said to destroy the utility of the product for the paper industry.

The following example will serve to illustrate my invention:

METHOD EXAMPLE 600 pounds of kaolin clay are pulverized with 18 pounds of sodium chloride and the mixture placed in a batch type rotary kiln. Ordinarily the kiln is heated when the mixture is added but good results have been obtained by adding the mixture to the kiln while at room temperature. The following is the table of time, temperature, loss in weight, brightness, etc.

*Table I*

| Hours | Temperature | Loss weight | Brightness | | Brightness gain |
| | | | Before heating | After heating | |
| --- | --- | --- | --- | --- | --- |
| | °C. | Per cent | | | Per cent |
| 5 | 785 | 14.8 | 83.6 | 86.8 | 3.8 |
| 5 | 845 | 14.8 | 83.6 | 88.6 | 6.0 |
| 5 | 900 | 15.0 | 83.6 | 90.0 | 7.7 |
| 5 | 925 | 15.0 | 83.6 | 91.4 | 9.3 |
| 5 | 965 | 15.0 | 83.6 | 92.1 | 10.1 |

The heat is then turned off and the mixture allowed to cool. The brightness of the original clay was about 83.6, while the brightness of the product heated for 5 hours at 965° C. was about 92.1, representing a gain of about 8.5 points, or 10.1 percent over the original brightness. The brightness values in all cases mentioned throughout the specification were obtained using the General Electric reflection meter with the infra-red filter, employing magnesium carbonate as a standard. The General Electric reflection meter is well known throughout the paper industry and is used almost exclusively for making standard brightness comparative tests.

The chemical and physical changes that take place upon heating the clay are not yet fully understood, particularly where a chemical is employed in the process. Available data indicate that the desired results are not obtainable by merely heating the clay to a temperature of between 400° C. and 500° C. the range in which the water of crystallization is expelled, and this appears to be true, whatever added chemical is used in the process. The high temperatures which have been found desirable, not only drive off chemically bonded water and effect a combustion of the organic matter, but also appear to destroy the colloidal character of the material resulting in a marked loss of plasticity. That is, the hydrophilic character of the clay seems to be reduced or substantially destroyed. Where a chemical such as common salt is employed, vapors such as hydrogen chloride are evolved, and although the salt is destroyed, as evidenced by the evolution of acid fumes, the finished product is substantially neutral, indicating that a chemical reaction has taken place. Investigations lead to the belief that a layer of white oxide, e. g. aluminum oxide, forms on the surface of the individual clay particles.

Tests of the end product, both in respect of its chemical and physical properties, and tests of finished commercial products, such as paper, in which the improved clay is used, indicate that this material which I have designated a modified clay is a new product. As also stated elsewhere herein, the new and distinctive character of the product appears fully established by examination of it with respect to one or more of several properties valuable in the paper industry, viz., ink receptivity, brightness, low gloss, and absence of darkening or "blackening" on calendering. According to tests, further indication of the new character of the product seems to be afforded, in the case of kaolin, by a comparison of the refractive index of the original material with the refractive index of the modified clay resulting from the process. The following table shows the change:

Table

| | Refractive index |
|---|---|
| Natural Georgia kaolin clay | 1.564 to 1.556 |
| Natural Georgia kaolin clay heated to 500° C. | 1.550 to 1.545 |
| Natural Georgia kaolin clay heated for a period of five hours to a temperature of 965° C. with 3% common salt | 1.535 to 1.520 |

Paper coated or filled with my modified clay or kaolin has a good brightness, low gloss, high smoothness, high oil absorption along with other improved printing properties. The coated paper may be calendered many times to insure a high smoothness without such darkening as ordinarily results from the calendering of clay coated papers.

The following example will serve to illustrate the use of my modified clay in a composition for coating paper.

Example

To 32 pounds of casein dispersed in a water solution of a mixture of the usual quantities of borax, soda ash and caustic, about 200 pounds of my modified clay prepared, for example, by the process described in the method example are added. The consistency of the material is adjusted by addition of water until the solid content is about 45 percent based on the weight of the water. The coating composition is then applied to the paper by use of the regular brush coating machine, coating one side at a time with a 13 pound coating. The paper is then thoroughly calendered and gives the following results:

Table

| | |
|---|---|
| K and N ink smear (test for printing ink receptivity) per cent | 33.5 |
| Gloss (Ingersoll): | |
| Wire side do | 35.7 |
| Felt side do | 41.0 |
| Smoothness (Bekk test): | |
| Wire side seconds | 274 |
| Felt side do | 307 |

When using my modified clays it is ordinarily possible to use about 2 to 4 percent less casein in the coating composition. My coating compositions, for example, containing as low as 12 percent casein binder have a satisfactory "pick" test as the modified clay adheres to the paper although subjected to violent treatment during the printing operation. The use of less casein is, of course, desirable due to the relatively high cost of the protein material. My modified clays are also particularly adapted for use as fillers in paper furnishes containing large percentages of ground wood pulp.

My modified clay has a relatively low cost making its use in large quantities economical. Its high oil receptivity makes it particularly adaptable for use as a coating for paper which is to be printed on alternately with different colored oil links. The high oil absorption makes rapid printing possible without fear of smearing. The strength of the paper incorporating my improved clay is also satisfactory as evidenced by the tear and fold properties. Although my improved clays have good brightness, the gloss or glare is low, making it particularly adaptable for use in the printing paper field.

The high oil absorption which characterizes my modified clay is evidenced, for example, by the following results of a series of tests, comparing other paper coating or filling materials with a batch of my modified clay which had been prepared by treating Georgia kaolin clay by the process hereinabove set forth, using about 3% of sodium chloride and a temperature of about 900° C. The oil absorptions were determined in terms of the number of grams of raw linseed oil required to form with 100 grams of the clay or other material, a firm putty-like consistency. The tests showed that four paper clays of good quality (not modified in accordance with my invention) respectively had oil absorptions of 44, 37, 34 and 33—the first of them being "Satin" clay, an extremely high quality Georgia kaolin material produced by the process of Patent No. 2,158,987, issued May 16, 1939. The test of my modified clay, however, showed its oil absorption to be 55, representing a very high oil absorption, of the same order as that of high grade carbonates (i. e. calcium carbonates, prepared for commercial use in the paper industry), of which representative samples from two sources each showed an oil absorption of 56.

I have emphasized the use of my improved or modified clay particularly as a paper-making pigment, or coating composition and the like, but its use is not limited thereto. The modified clay, for example, may also be used in the rubber industry as a filler and may in addition be used to advantage in linoleums and ceramics.

The Bekk test for smoothness, as identified herein, refers to determinations with the Bekk smoothness tester, a widely used instrument for testing paper smoothness. This instrument includes a mercury manometer wherein the mercury may be raised to a standard height by a vacuum pump. The manometer is connected through a valve to an aperture (11 mm. in diameter) in a polished metal anvil having an area of 10 square centimeters. The sheet surface to be tested is pressed flat against the anvil under a pressure of one kilogram per square centimeter, and the valve is opened connecting the aperture with the vacuum chamber of the manometer. Inasmuch as the only air then reaching the vacuum chamber is that which passes between the paper surface and the anvil, the smoothness of the paper surface is measured by the number of seconds required for the mercury to drop a standard distance of 20 mm., as timed from the opening of the valve; whereby a low reading in seconds indicates rough paper and a high reading indicates smooth paper. The fall of 20 mm. is equivalent to the passage of 10 cubic centimeters of air between the paper and the anvil.

This application is a continuation in part of my copending application, Serial No. 180,829, filed December 20, 1937.

While I have illustrated my invention showing certain preferred embodiments thereof, it will be understood that my invention is not limited thereto. All modifications coming within the true spirit and scope of my invention are intended to be covered by the claims appended thereto.

What I claim is:

1. In a method of treating Georgia kaolin clay to produce a material adapted for use in or on paper, the steps comprising increasing the ink receptivity and reducing the gloss of the clay by heating it to a temperature of at least about 600° C. and not higher than about 1200° C., and treating the product of said heat-treatment to reduce it to a particle size of a fineness adapted for coating paper to produce a coated surface susceptible of being calendered to a smoothness of at least about 300 Bekk.

2. In a method of treating Georgia kaolin clay to produce a material adapted for use in or on paper, the steps comprising increasing the brightness and ink receptivity and reducing the gloss of the clay by heating it in the presence of material selected from the group consisting of the chlorides, chlorates, bromides, nitrates, sulphites and hydroxides of alkali, alkaline earth and amphoteric metals, to a temperature of at least about 600° C. and not higher than about 1200° C., and treating the product of said heat-treatment to reduce it to a particle size adapted for use in coating paper.

3. In a method of manufacturing from kaolin clay a modified material adapted for use in or on paper, the steps comprising increasing the brightness and ink receptivity and reducing the gloss of the clay by heating it in the presence of reagent material selected from the group consisting of the chlorides, chlorates, bromides, nitrates, sulphites and hydroxides of alkali, alkaline earth and amphoteric metals, to a temperature of at least about 600° C. and below sintering temperature, and treating the product of said heat-treatment to reduce it to a particle size adapted for use in coating paper.

4. The method of claim 3, wherein the selected reagent material comprises an alkali metal chloride.

5. The method of claim 3, wherein the selected reagent material comprises an alkaline-earth metal chloride.

6. The method of claim 3, wherein the selected reagent material comprises an amphoteric metal chloride.

7. In a method of manufacturing from kaolin clay a modified material adapted for use in or on paper, the steps comprising increasing the ink receptivity and reducing the gloss of the clay by heating it to a temperature of at least about 600° C. and below sintering temperature, and treating the product of said heat-treatment to reduce it to a particle size of a fineness adapted for coating paper to produce a coated surface susceptible of being calendered to a smoothness of at least about 300 Bekk.

8. As a new product, modified kaolin clay, substantially free of bonded water, and in particle size suitable for paper use and of a fineness adapted for coating paper to produce a coated surface susceptible of being calendered to a smoothness of at least about 300 Bekk, said modified clay having high brightness, having substantially higher ink receptivity and substantially lower gloss than Georgia kaolin clay and being substantially identical with Georgia kaolin clay which has been modified by heating it in the presence of material selected from the group consisting of the chlorides, chlorates, bromides, nitrates, sulphites and hydroxides of alkali, alkaline earth and amphoteric metals, to a temperature of at least about 600° C. and not higher than about 1200° C. to increase its brightness and ink receptivity and to lower its gloss.

9. As a new product, modified kaolin clay, substantially free of bonded water, and in particle size suitable for paper use and of a fineness adapted for coating paper to produce a coated surface susceptible of being calendered to a smoothness of at least about 300 Bekk, said modified clay having substantially higher ink receptivity and substantially lower gloss than Georgia kaolin clay and being substantially identical with Georgia kaolin clay which has been modified by heating it to a temperature of at least 600° C. and not higher than about 1200° C. to increase its ink receptivity and to lower its gloss.

10. As a new product, modified kaolin clay, substantially free of bonded water, and in particle size adapted for use in coating paper, said modified clay having substantially higher ink receptivity and substantially lower gloss than Georgia kaolin clay and being substantially identical with Georgia kaolin clay which has been modified by heating it with about 3 per cent sodium chloride for about five hours at a temperature of about 785° to 965° C.

11. As a new product, modified kaolin clay, substantially free of bonded water, and in particle size adapted for paper use, said modified clay being substantially free of particles larger than 40 microns in equivalent spherical diameter and containing not more than about 20 per cent of particles larger than 10 microns and not more than about 60 per cent of particles larger than 5 microns, and said modified clay having high brightness and ink receptivity and having low gloss, and being substantially identical with kaolin clay which has been modified by heating it in the presence of sodium chloride to a temperature of at least about 600° C. and below sintering temperature to increase its brightness and ink receptivity and to lower its gloss.

12. As a new product, modified kaolin clay, substantially free of bonded water, and in particle size adapted for paper use, said modified clay containing not more than about 1 per cent of particles large than 30 microns in equivalent spherical diameter, not more than about 12 per cent larger than 10 microns and not more than about 50 per cent larger than 5 microns, and said modified clay having high ink receptivity and low gloss, and being substantially identical with kaolin clay which has been modified by heating it with about 0.5% to about 5% of an alkaline earth chloride to a temperature of at least about 600° C. and below sintering temperature to increase its brightness and ink receptivity and to lower its gloss.

13. As a new product, modified kaolin clay, substantially free of bonded water, and in particle size adapted for paper use, said modified clay being substantially free of particles larger than 40 microns in equivalent spherical diameter and containing not more than about 1 per cent of particles larger than 30 microns, and said modified clay having high brightness and ink receptivity and having low gloss, and being substantially identical with kaolin clay which has been modified by heating it in the presence of material selected from the group consisting of the chlorides, chlorates, bromides, nitrates, sulphites and hydroxides of alkali, alkaline earth and amphoteric metals, to a temperature of at least about 600° C. and below sintering temperature, to increase its brightness and ink receptivity and to lower its gloss.

14. As a new product, modified kaolin clay, substantially free of bonded water, and in particle size adapted for paper use, said modified clay being substantially free of particles larger than 40 microns in equivalent spherical diameter and containing not more than about 20 per cent of particles larger than 10 microns and not more than about 60 per cent of particles larger than 5 microns, and said modified clay having high ink receptivity and low gloss and being substantially identical with kaolin clay which has been modified by heating it to a temperature of at least about 600° C. and below sintering temperature, for at least about an hour, to increase its ink receptivity and lower its gloss.

15. As a new product, modified kaolin clay, substantially free of bonded water, and in particle size adapted for paper use, said modified clay being substantially free of particles larger than 40 microns in equivalent spherical diameter and containing not more than about 1 per cent of particles larger than 30 microns, and said modified clay having high ink receptivity and low gloss and being substantially identical with kaolin clay which has been modified by heating it to a temperature of at least about 600° C. and below sintering temperature to increase its ink receptivity and lower its gloss.

16. As a new product, modified kaolin clay, substantially free of bonded water, and in particle size adapted for paper use, said modified clay being substantially free of particles larger than 30 microns in equivalent spherical diameter and containing not more than about 2 per cent larger than 10 microns and not more than about 20 per cent larger than 5 microns, and said modified clay having high ink receptivity and low gloss and being substantially identical with kaolin clay which has been modified by heating it to a temperature of at least about 600° C. and below sintering temperature to increase its ink receptivity and lower its gloss.

17. A material for use as a paper filler, paper coating material or other uses comprising a fine grained, modified kaolin clay, in particle size adapted for paper use, resulting from the heat treatment of a batch of kaolinic clay, including subjecting the clay throughout to a temperature ranging between 600° to 1200° C., for substantially increasing the ink receptivity of the clay, with the temperature of the heat used in said treatment being of an amount within said range so as to yield a product substantially identical with Georgia kaolin clay which has been modified by heating it for 1 to 5 hours at a temperature of about 785° to 965° C. to increase its ink receptivity and lower its gloss, the first mentioned modified kaolin clay being thus substantially identical with Georgia kaolin clay modified as last mentioned, and being substantially free of bonded water.

BEN W. ROWLAND.